United States Patent
Kumagai et al.

(10) Patent No.: US 8,120,303 B2
(45) Date of Patent: Feb. 21, 2012

(54) METHOD AND APPARATUS FOR CONTROLLING INERTIAL SYSTEM

(75) Inventors: Tsuyoshi Kumagai, Braintree, MA (US); Zhenghua Luo, Markham (CA)

(73) Assignee: Oriental Motor Co., Ltd., Tokyo (JP)

( * ) Notice: Subject to any disclaimer, the term of this patent is extended or adjusted under 35 U.S.C. 154(b) by 814 days.

(21) Appl. No.: 12/239,866

(22) Filed: Sep. 29, 2008

(65) Prior Publication Data

US 2010/0079100 A1    Apr. 1, 2010

(51) Int. Cl.
G05B 5/01    (2006.01)
G05B 11/01    (2006.01)

(52) U.S. Cl. .................................. 318/611; 318/560

(58) Field of Classification Search .......... 318/560, 318/561, 569, 611, 623, 607, 448
See application file for complete search history.

(56) References Cited

U.S. PATENT DOCUMENTS

| | | | |
|---|---|---|---|
| 4,956,789 A * | 9/1990 | Hamada et al. | 700/280 |
| 5,296,790 A * | 3/1994 | Fincher | 318/560 |
| 5,428,285 A * | 6/1995 | Koyama et al. | 318/799 |
| 5,432,422 A * | 7/1995 | Nagano et al. | 318/611 |
| 5,638,267 A * | 6/1997 | Singhose et al. | 700/28 |
| 5,659,234 A * | 8/1997 | Cresens | 318/696 |
| 6,876,168 B1 * | 4/2005 | Luo et al. | 318/560 |
| 6,936,990 B2 * | 8/2005 | Oyama et al. | 318/632 |
| 7,173,399 B2 * | 2/2007 | Sihler et al. | 322/40 |
| 2004/0084267 A1 * | 5/2004 | Allaei | 188/378 |
| 2007/0067049 A1 * | 3/2007 | Zhou et al. | 700/28 |
| 2008/0320068 A1 * | 12/2008 | Bowling et al. | 708/300 |

FOREIGN PATENT DOCUMENTS

| | | |
|---|---|---|
| JP | 10-056790 A | 2/1998 |
| JP | 2005-168225 A | 6/2005 |

* cited by examiner

Primary Examiner — Eduardo Colón
(74) Attorney, Agent, or Firm — Trop, Pruner & Hu, P.C.

(57) ABSTRACT

Suppression of vibration of a load machine without reducing the responsiveness of the load machine to an operation command is achieved by a method and an apparatus for controlling an inertial system intended to control an inertial system that has a motive power generator and a load machine that are coupled to each other via a torque transmission element. Acceleration command information that designates the acceleration of the load machine is multiplied by a predetermined gain to produce a vibration suppression control variable. The vibration suppression control variable is added to the position command to form a vibration suppression control command, and the inertial system is controlled according to the vibration suppression control command.

17 Claims, 9 Drawing Sheets

METHOD AND APPARATUS FOR CONTROLLING INERTIAL SYSTEM

BACKGROUND OF THE INVENTION

1. Field of the Invention

The present invention relates to a method and to an apparatus for controlling an inertial system. In particular, the present invention relates to a technique for suppressing vibration in an inertial system.

2. Description of Related Art

A mechanism, in which a motive power generator and a load machine, which are inertial bodies, are coupled via an compliant torque transmission element, is a two-inertia system. When the motive power generator produces abrupt acceleration or deceleration, a deviation occurs between the position and speed of the motive power generator and those of the load machine in the two-inertia system. Thus, if a typical servo control device is used to control the two-inertia system, the system stability decreases, and vibration occurs on load machine.

The typical servo control device has a rotation detector on the side of the rotational motive power generator. Therefore, when the stiffness of the torque transmission element is so low that the load machine is not regarded as a rigid body, the motion of the load machine is delayed because of the torsion of the torque transmission element. Thus, although the motive power generator can follow the position command, the load machine can no longer follow the position command, and as a result, vibration occurs on load machine.

As a solution to this problem, for example, Japanese Patent Laid-Open No. 10-56790 discloses a vibration suppression approach that suppresses vibration in a two-inertia system by removing a vibration component from an operation command. According to this vibration suppression method, the operation command is filtered by a vibration suppression filter having the same frequency characteristics as a notch filter, thereby suppressing a gain peak due to an anti-resonance frequency.

However, in the conventional vibration suppression apparatus there is a possibility that the motion of the load machine is slowed, or that the response of the load machine to the operation command is delayed, because of the responsiveness of the vibration suppression filter.

SUMMARY OF THE INVENTION

Thus, the purpose of the present invention is to provide a method and an apparatus for controlling an inertial system that can suppress vibration of a load machine without reducing the responsiveness of the load machine to an operation command.

The present invention provides a method for controlling an inertial system that has a motive power generator, a load machine, and a torque transmission element that couples the motive power generator and the load machine to each other. In order to attain the objective described above, the control method includes a step of generating a position command and an acceleration command that are in phase with each other, a step of setting a vibration suppression control variable by multiplying the acceleration command by a predetermined gain; and a step of forming a control command by adding the vibration suppression control variable to the position command.

The step of generating a position command and an acceleration command that are in phase with each other can include a sub-step of estimating the acceleration command based on an input position command and estimating the position command that is in phase with the acceleration command based on the estimated acceleration command. In this case, the input position command is composed of a pulse sequence.

According to the present invention to get better vibration suppression, the method can include a step of suppressing jerk components of the position command and the acceleration command that are in phase with each other. This is accomplished by using first and second filter elements having the same frequency characteristics, respectively.

In the case in which the position command and the acceleration command that are in phase with each other are estimated from the input position command as described above, a jerk component of the input position command can be suppressed by a filter element so that the jerk components of the estimated position command and acceleration command are suppressed.

The gain by which the acceleration command is multiplied can be set based on an anti-resonance frequency of the inertial system or based on a stiffness coefficient of the torque transmission element and an inertia value of the load machine.

The present invention also provides an apparatus for controlling an inertial system that has a motive power generator, a load machine, and a torque transmission element that couples the motive power generator and the load machine to each other. In order to attain the objective described above, the apparatus includes a command generating device for generating a position command and an acceleration command that are in phase with each other, an manipulated variable setting device for setting a vibration suppression control variable by multiplying the acceleration command by a predetermined gain, a control command forming device for forming a control command by adding the vibration suppression control variable to the position command, and a driving device for driving the motive power generator based on the control command.

For example, the command generating device may be configured to estimate the acceleration command based on an input position command and estimate the position command that is in phase with the acceleration command based on the estimated acceleration command. In this case, the input position command is a position command composed of a pulse sequence, for example.

The command generating device can be configured to internally directly generate the position command and the acceleration command that are in phase with each other. In this case, the input position command is not necessary, therefore the configuration of the apparatus is simplified.

According to the present invention to get better vibration suppression, the apparatus may further include first and second filter elements that suppress jerk components of the position command and the acceleration command that are in phase with each other, respectively. The first and second filter elements have the same frequency characteristics.

In the case of using the command generating device that estimates the position command and the acceleration command that are in phase with each other from the input position command, a filter element that removes a jerk component of the input position command can be used so that the jerk components of the estimated position command and acceleration command are suppressed.

The gain by which the variable setting device multiplies the acceleration command can be set based on an anti-resonance frequency of the inertial system or based on a stiffness coefficient of the torque transmission element and an inertia value of the load machine. The variable setting device may have a means of manually adjusting the gain.

The present invention also applies an industrial machine that uses any of the control apparatuses described above.

According to the present invention, the vibration suppression control variable is the acceleration command multiplied by the predetermined gain, and the vibration suppression control variable is added to the position command as a feed-forward control variable. Therefore, a torque required to make the load machine start moving can be produced on the torque transmission element to achieve quick response of the load machine and prevent vibration of the load machine.

In addition, since the gain can be set based on a single constant parameter, that is, the anti-resonance frequency of the inertial system, it does not require time for parameter adjustment, and the components for achieving vibration suppression are simplified. In addition, since the vibration suppression control variable is used as the feed-forward control variable, the vibration suppression control variable does not adversely affect the response frequency of the control system nor cause an instability in the control system. Therefore, typical users can achieve effective vibration suppression without specialized knowledge or techniques.

The present invention can be applied to any inertial system that includes a rotary or translation mechanism or that includes an electric or non-electric motive power generator. Therefore, the present invention can be widely applied to vibration suppression control of machines that include a torque transmission element having low stiffness. In addition, the present invention can be advantageously applied to both an open loop control system and a closed loop control system.

DESCRIPTION OF THE PREFERRED EMBODIMENTS

Figure 1:
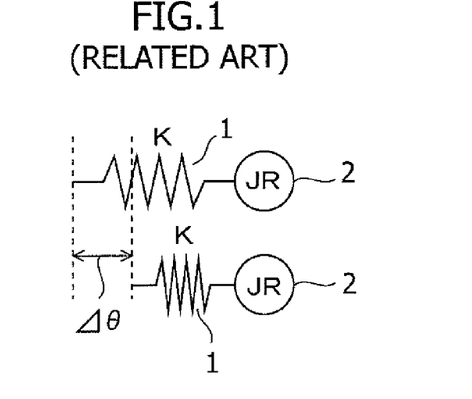
FIG. 1 is a conceptual diagram showing a model of a two-inertia system.

A mechanism for transmitting an output of a rotational motive power generator to a load in an inertial system via a torque transmission element is configured as a two-inertia system. FIG. 1 shows the relationship between a torque transmission element 1 and a load element 2. As shown in this drawing, in the two-inertia system, the torque transmission element 1, which is compliant, can be modeled as a spring. As will be apparent from the following description, the present invention uses the spring kinematics to suppress the vibration of the load element 2.

The upper part of FIG. 1 shows a state in which no torque is applied to the load element 2. When a torque is applied to the load element 2 via the torque transmission element 1, the torque transmission element 1 is elastically deformed as shown in the lower part of FIG. 1, and as a result, a position deviation $\Delta\theta$ occurs between the torque transmission element 1 and the load element 2. A torque $T_1$ occurring on the torque transmission element 1 is expressed by the following equation of motion.

$$T_1 = K \cdot \Delta\theta \quad (1)$$

In this formula, K denotes the stiffness coefficient (or spring constant) of the torque transmission element 1.

A torque $T_2$ required to make the load element 2 start moving is expressed by the following equation of motion, the acceleration of the load element 2 is denoted by $\alpha$.

$$T_2 = J_R \cdot \alpha \quad (2)$$

In this formula, $J_R$ denotes an inertia value of the load element 2.

The load element 2 starts moving when the following condition is satisfied.

$$T_1 = T_2 \quad (3)$$

Therefore, the position deviation $\Delta\theta$ required to generate the torque $T_1$ that makes the load element 2 move is expressed by the following formula, which is derived from Formulas (1) and (2).

$$\Delta\theta = \frac{J_R}{K} \cdot \alpha \quad (4)$$

As described later, according to the present invention, a control command, which is a combination of a position command and an manipulated variable that corresponds to the position deviation $\Delta\theta$ described above, is used to control an inertial system. Therefore, a torque sufficient to make the load element follow the position command is applied to the load element to suppress the vibration of the load element. The present invention is based on the physical principle described above.

Figure 2:
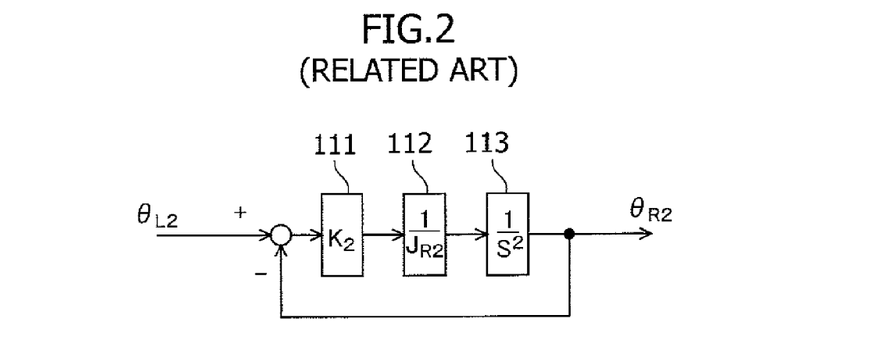
FIG. 2 is a block diagram showing a typical control model for a two-inertia system.

FIG. 2 is a block diagram showing a typical control model for a two-inertia system. This model includes a torque transmission element 111 having a stiffness coefficient of $K_2$, a load machine 112 having an inertia value of $J_{R2}$, and a double integrator 113. In FIG. 2, $\theta_{L2}$ denotes a position command, $\theta_{R2}$ denotes the position of the load machine 112, and s denotes the Laplace operator.

A transfer function for the model is expressed as follows.

$$\frac{\theta_{R2}}{\theta_{L2}} = \frac{\frac{K_2}{J_{R2}}}{s^2 + \frac{K_2}{J_{R2}}} \quad (5)$$

From the Formula (5), the following Formula (6), which represents the relationship between the position command $\theta_{L2}$ and the position $\theta_{R2}$ of the load machine 112, is derived.

$$\theta_{L2} = \frac{J_{R2}}{K_2} \cdot \frac{d^2}{dt^2}\theta_{R2} + \theta_{R2} \quad (6)$$

The second-order differential term in the first term of the right-hand side of the Formula (6), shown below, represents the acceleration of the load machine 112. Thus, it can be seen that the position deviation $\Delta\theta$ expressed by the Formula (4) and the first term of the right-hand side of the Formula (6) are equivalent to each other.

$$\frac{d^2}{dt^2}\theta_{R2} \quad (7)$$

That is, Formula (6) shows that the position $\theta_{R2}$ of the load machine 112 is delayed from the position command $\theta_{L2}$ by the position deviation $\Delta\theta$ expressed by Formula (4). Therefore, if the position deviation $\Delta\theta$ expressed by Formula (4) is added to the position command $\theta_{L2}$, or in other words, if the rotational motive power generator is activated $\Delta\theta$ earlier than in the case in which the position command $\theta_{L2}$ is used by itself, the position $\theta_{R2}$ of the load machine 112 can follow the position command $\theta_{L2}$.

Figure 3:
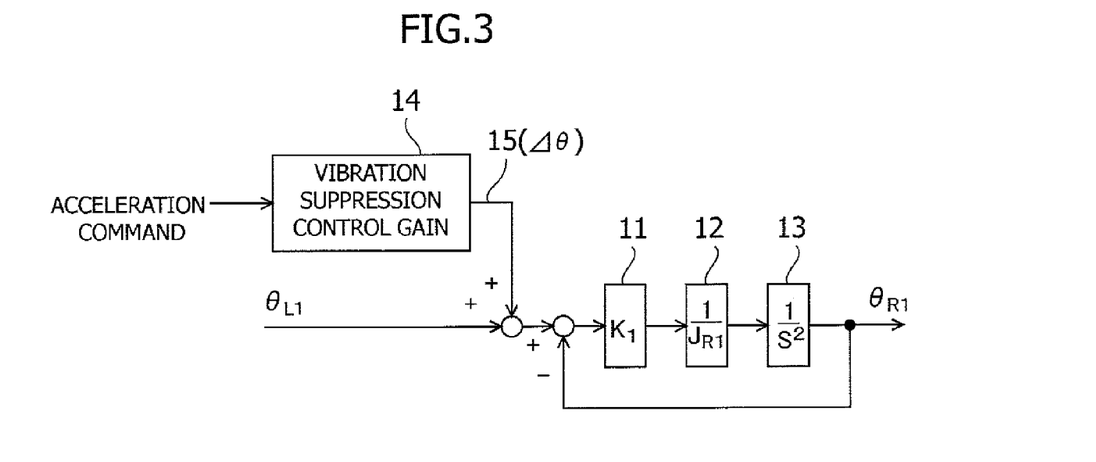
FIG. 3 is a block diagram showing a control model for a two-inertia system according to a vibration suppression principle of the present invention.

FIG. 3 is a block diagram showing a control model for a two-inertia system based on the principle described above. In this block diagram, a torque transmission element 11, a load machine 12, and a double integrator 13 correspond to the torque transmission element 111, the load machine 112, and the double integrator 113 shown in FIG. 2, respectively. However, in this block diagram, the torque transmission element 11 has a stiffness coefficient of $K_1$, the load machine 12 has an inertia value of $J_{R1}$, the position command is denoted by $\theta_{L1}$, and the position of the load machine 12 is denoted by $\theta_{R1}$.

In the control model, a vibration suppression control gain 14 is intended to generate a vibration suppression control variable 15 and is set according to the following Formula (8).

$$\frac{J_{R1}}{K_1} \quad (8)$$

The vibration suppression control gain 14 corresponds to $J_R/K$ in the right-hand side of the Formula (4), and an acceleration command 20 corresponds to the acceleration $\alpha$ in the same formula. Therefore, the vibration suppression control variable 15 corresponds to the position deviation $\Delta\theta$ in Formula (4).

The vibration suppression control variable 15 is added to the position command $\theta_{L1}$ as feed-forward information. Therefore, with the control model shown in FIG. 3, it suppresses the delay ($\Delta\theta$) of the position $\theta_{R1}$ of the load machine 12 with respect to the position command $\theta_{L1}$ and can be improved the ability of following of the load machine 12 with respect to position command $\theta_{L1}$. The improvement in the ability of following, as a result, leads to suppress the vibration of the load machine 12.

In the two-inertia system such as that shown in FIG. 1, an anti-resonance frequency occurs. The anti-resonance frequency $\omega_R$ is determined by the stiffness coefficient K of the torque transmission element and the inertia value $J_R$ of the load machine, as expressed by the following Formula (9).

$$\omega_R = \sqrt{\frac{K}{J_R}} \quad (9)$$

In the control model shown in FIG. 3, the right-hand side of Formula (9) equals to the inverse of the square root of the vibration suppression control gain 14 expressed by Formula (8). Therefore, the vibration suppression control gain 14 described above is expressed by using the anti-resonance frequency $\omega_R$ as follows.

$$\frac{1}{\omega_R^2} \quad (10)$$

The Formula (10) means that the vibration suppression control according to the present invention can be achieved based on a single parameter, the anti-resonance frequency $\omega_R$.

As described above, the vibration suppression control based on the control model shown in FIG. 3 involves using the vibration suppression control variable 15 as one of manipulated variable used to suppress the delay of the motion of the load machine 12. That is, the vibration suppression control greatly differs from typical vibration suppression control methods, which use filter means to round operation commands. Therefore, the load machine 12 can quickly respond to the position command $\theta_{L1}$.

Figure 4:
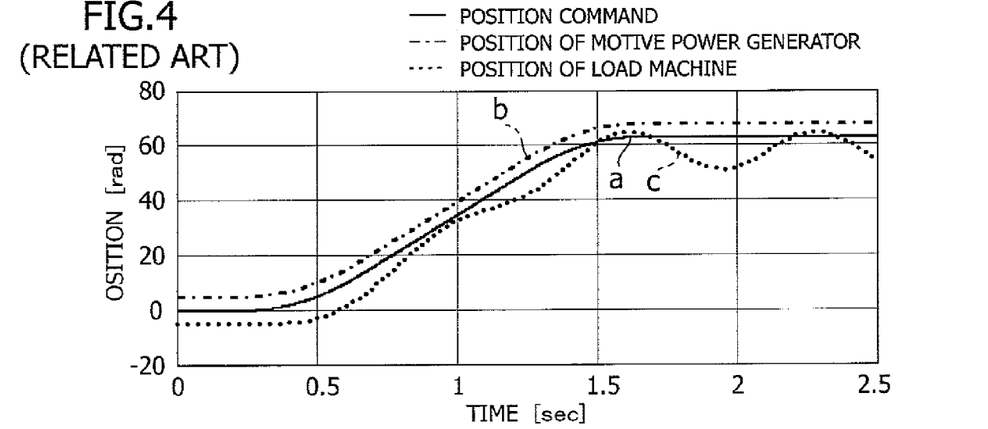
FIG. 4 is a graph showing the result of a simulation performed with the control model shown in FIG. 2.
Figure 5:
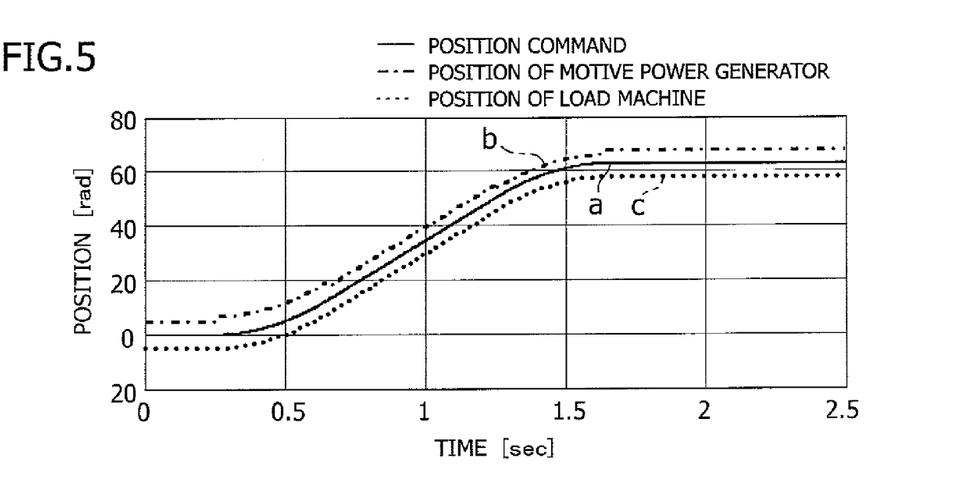
FIG. 5 is a graph showing the result of a simulation performed with the control model shown in FIG. 3.
Figure 6:
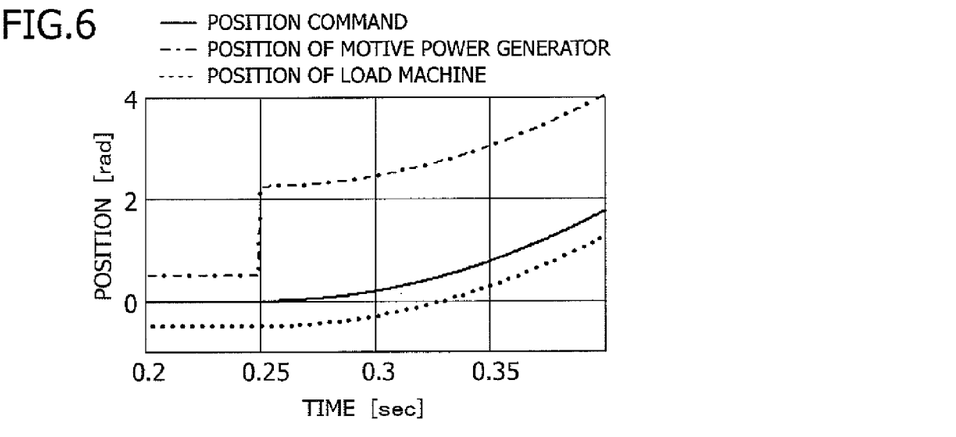
FIG. 6 is an enlarged view specifically showing a rising period during the variation of the position of a motive power generator shown in FIG. 5.

FIGS. 4 and 5 show results of simulations performed using the control models shown in FIGS. 2 and 3, respectively. In FIGS. 4 and 5, the solid line a indicates variation in the position command $\theta_L$, the alternate long and short dash line b indicates a variation in the position of the motive power generator responsive to the variation of the position command $\theta_L$, and the dotted line c indicates a variation in the position $\theta_R$ of the load machine in response to the variation in the position command $\theta_L$. FIG. 6 is an enlarged view specifically showing a rising period during the variation of the position of the motive power generator shown in FIG. 5. In FIGS. 4 to 6, to facilitate understanding of the motion of the motive power generator and the load machine, appropriate offsets are added to the actual simulation results for the motive power generator and the load machine.

The simulations were performed under the following operational conditions.

TABLE 1

| Operating distance | D [rad] | 62.8 |
| Operating velocity | V [rad/sec] | 62.8 |
| Acceleration time | $t_A$ [msec] | 400 |

TABLE 1-continued

| Load inertia | $J_R$ [kgm$^2$] | 5.6 * 10$^{-3}$ |
|---|---|---|
| Stiffness coefficient | K [Nm/rad] | 0.5 |

Under the operational conditions described in the above table, the vibration suppression control variable 15 (see FIG. 3) required for vibration suppression control is expressed as follows.

$$\Delta\theta_{L1}=1.785 [\text{rad}] \quad (11)$$

The control model shown in FIG. 2 performs no vibration suppression control. Therefore, as is apparent from FIG. 4, the position $\theta_{R2}$ of the load machine 112 is delayed with respect to the position command $\theta_{L2}$. As a result, the load machine 112 undergoes a resonance caused by the delay and vibrates.

However, the model shown in FIG. 3 performs the vibration suppression control using the vibration suppression control variable 15. Therefore, as shown in FIG. 5, the position $\theta_{R1}$ of the load machine 12 follows the position command $\theta_{L1}$. Thus, the load machine 12 does not vibrate, and the position $\theta_{R1}$ of the load machine 12 is not delayed with respect to the position command $\theta_{L1}$. FIG. 6 shows that the vibration suppression control variable according to calculation is added to the position of the motive power generator 11.

Figure 7:
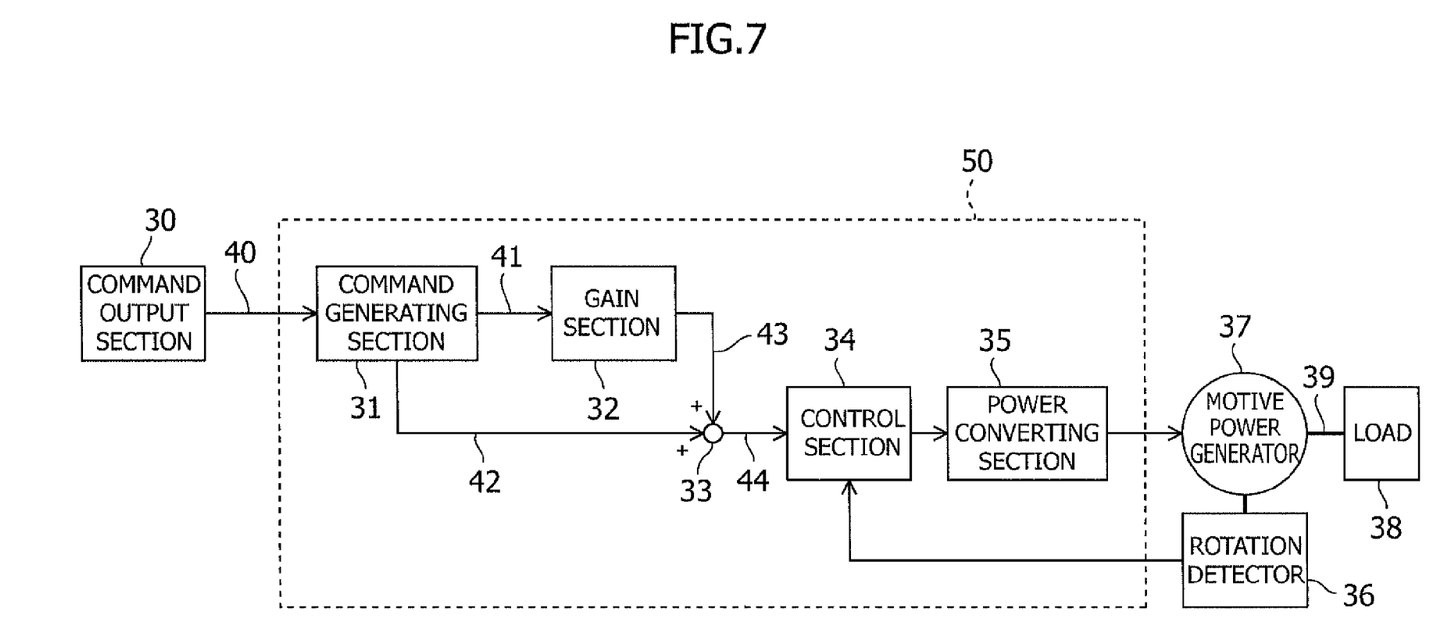
FIG. 7 is a block diagram showing a control apparatus according to a first embodiment of the present invention.

FIG. 7 is a block diagram showing a control apparatus that performs the vibration suppression control described above according to a first embodiment of the present invention. The control apparatus comprises a command output section 30, a command generating section 31, a gain section 32, an adder 33, a control section 34, a power converting section 35, and a rotation detector 36. A motive power generator 37 and a load machine 38, which are to be controlled, are coupled via a torque transmission element 39 to form a two-inertia system.

In the control apparatus, the command output section 30 is separated from a control unit 50, which includes the elements 31 to 35. It outputs a position command 40 composed of a pulse sequence.

The position command 40 composed of a pulse sequence contains an acceleration component. Thus, the command generating section 31 estimates an acceleration command 41 based on a variation in frequency of the input of position command. In addition, the command generating section 31 estimates a position command 42 from the estimated acceleration command 41. The estimated acceleration command 41 and the estimated position command 42 are formed from the position command 40 composed of a pulse sequence and, therefore, are in phase with each other. The estimated acceleration command 41 corresponds to the acceleration command 20 shown in FIG. 3, and the estimated position command 42 corresponds to the position command $\theta_{L1}$ shown in FIG. 3.

Figure 8:
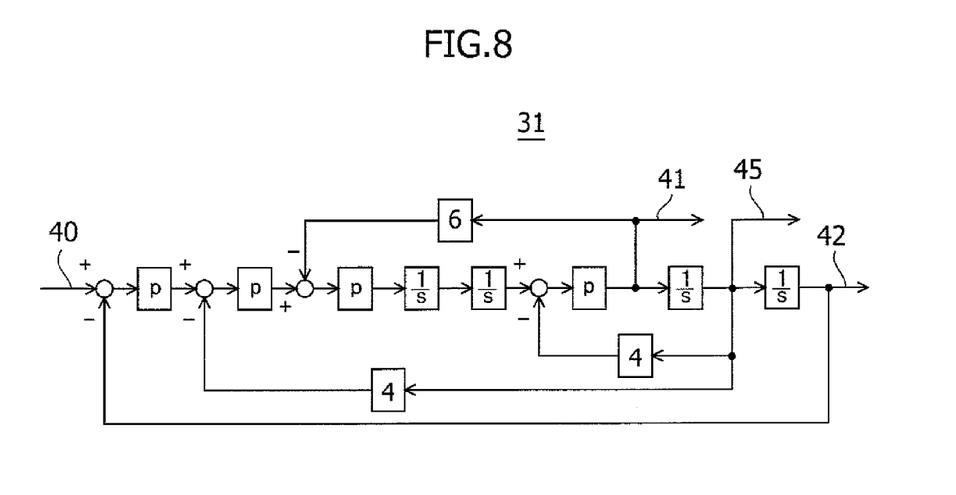
FIG. 8 is a block diagram showing an example of the configuration of a command generating section.

FIG. 8 is a block diagram showing an example of the configuration of the command generating section 31. The command generating section 31 shown in this drawing has a fourth-order low pass filter. However, the present invention is not limited to the configuration shown in this drawing. Any configuration or a filter of any order can be used, as long as the same function is achieved. The command generating section 31 is also configured to estimate a velocity command 45. As required, the estimated velocity command 45 is supplied to the control section 34 as information used in speed feed-forward control, for example.

Figure 9:
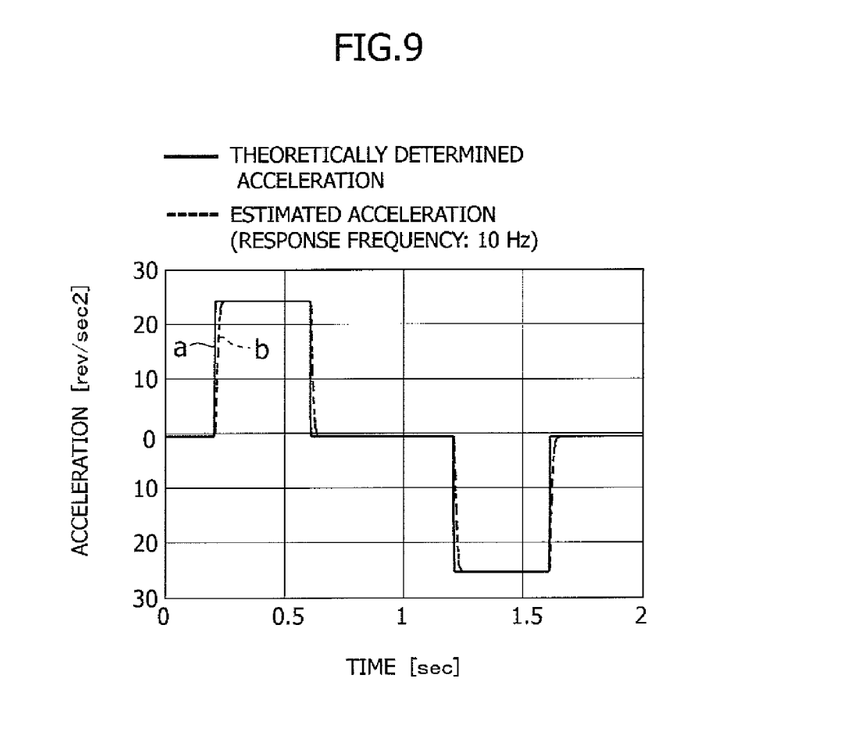
FIG. 9 is a graph showing characteristics of a variation of a theoretically determined acceleration of a load machine and characteristics of a variation of an estimated acceleration of the load machine.

Referring to FIG. 9, the solid line a indicates an acceleration command that is theoretically determined, and the dotted line b indicates the estimated acceleration command 41 output from the command generating section 31 shown in FIG. 8. As is apparent from FIG. 9, the estimated acceleration command 41 substantially agrees with the theoretically determined acceleration. This means that the acceleration information estimated by the command generating section 31 as the acceleration information required for the vibration suppression control according to the present invention (the estimated acceleration command 41) can be used without problems.

The gain section 32 shown in FIG. 7 multiplies the estimated acceleration command 41 output from the command generating section 31 by a predetermined gain, that is, the vibration suppression control gain expressed by Formula (8) or (10) to form a vibration suppression control variable 43, which corresponds to the vibration suppression control variable 15 shown in FIG. 3.

The estimated position command 42 output from the command generating section 31 is supplied to one input of the adder 33, and the vibration suppression control variable 43 that is output from the gain section 32 is supplied to the other input of the adder 33 as feed-forward control information. The adder 33 sums the estimated position command 42 and the vibration suppression control variable 43 to form a vibration suppression control command 44 and outputs the vibration suppression control command 44 to the control section 34.

When the motive power generator 37 is an electric motor, for example, the control section 34 typically performs both position control and speed control. That is, the control section 34 compares the position of the motive power generator (electric motor) 37 detected by the rotation detector 36 with the vibration suppression control command 44 and forms a velocity command corresponding to the position deviation between the two. Then, the control section 34 compares the speed of the motive power generator 37 calculated based on the output of the rotation detector 36 with the velocity command and outputs a torque command corresponding to the velocity deviation between the two to the power converting section 35.

The control section 34 performs a proportional (P) processing on the position deviation and a proportional integral (PI) processing on the velocity deviation.

When the motive power generator 37 is an electric motor, the power converting section 35 can be composed of a software element and a hardware element. The software element performs a modification processing, such as pulse width modulation (PWM) and/or pulse amplitude modulation (PAM), on the torque command output from the control section 34 to generate a modulated signal corresponding to the torque command. On the other hand, the hardware element uses the modulated signal to make a switch element, such as an insulated gate bipolar transistor (IGBT) or a metal oxide semiconductor field effect transistor (MOSFET), conduct a switch operation, thereby adjusting the voltage applied to the motive power generator 37.

The control apparatus according to the present invention configured as described above performs vibration suppression control based on the vibration suppression control variable 43, because the vibration suppression control variable 43 output from the gain section 32 is supplied to the estimated position command 42 as feed-forward information. As a result, the load machine 38 quickly responds to the estimated position command 42, and the vibration of the load machine 38 is effectively suppressed.

As shown by the Formula (10), the vibration suppression control gain in the gain section 32 is defined as the square of the inverse of the anti-resonance frequency $\omega_R$ of the two-inertia system including the motive power generator 37, the load machine 38 and the torque transmission element 39. Therefore, the vibration suppression control gain can be treated as a constant parameter. Therefore, the gain can be set based on the anti-resonance frequency $\omega_R$ of the two-inertia system used. In this case, the gain section 32 can perform the calculation of the Formula (10) for determining the gain.

In addition, as is apparent from Formula (8), the gain is defined by the stiffness coefficient $K_1$ of the torque transmission element 39 and the inertia value $J_{R1}$ of the load machine 38, and therefore, it can be determined from the stiffness coefficient $K_1$ and the inertia value $J_{R1}$. In this case, the gain section 32 can perform the calculation of Formula (8) for determining the gain.

The gain section 32 has a way to adjust gain using a device, such as a variable resistor. This can be used to set the gain at an optimum value by operating the device for adjusting the gain while checking the vibration of the load machine 38.

The gain can be automatically set by using a learning function, for example. In this case, the gain is set to minimize the vibration of the load machine 38 by using an appropriate learning rule.

Figure 10:
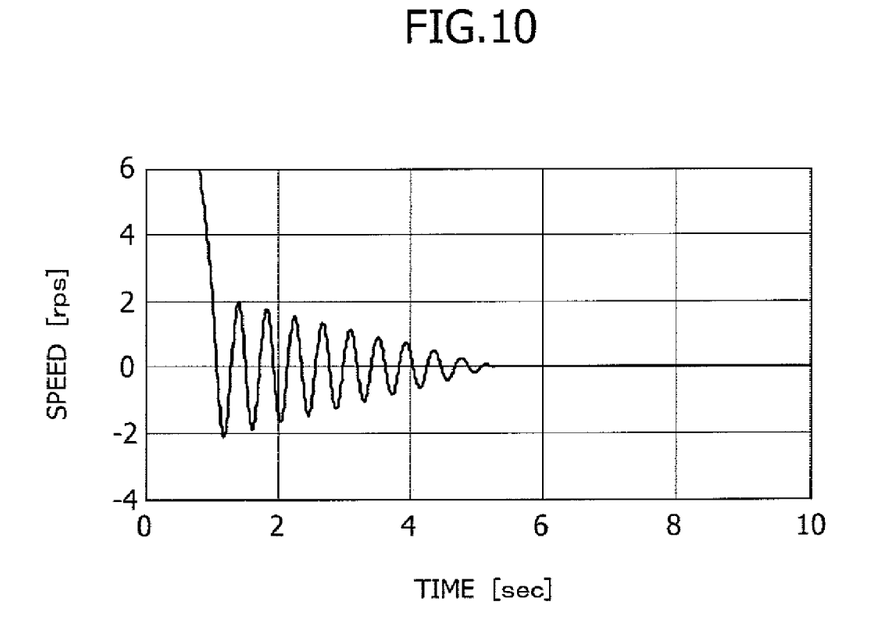
FIG. 10 is a graph showing behavior of the speed of the load machine after operation of the motive power generator is ended in the case in which feed-forward control using a vibration suppression control variable is not performed.

If the feed-forward control (vibration suppression control) using the vibration suppression control variable 43 is not performed, the velocity of the load machine 38 exhibits a behavior shown in FIG. 10 after the operation of the motive power generator 37 is terminated. That is, even after the operation of the motive power generator 37 is terminated, the load machine 38 keeps moving while vibrating.

Figure 11:
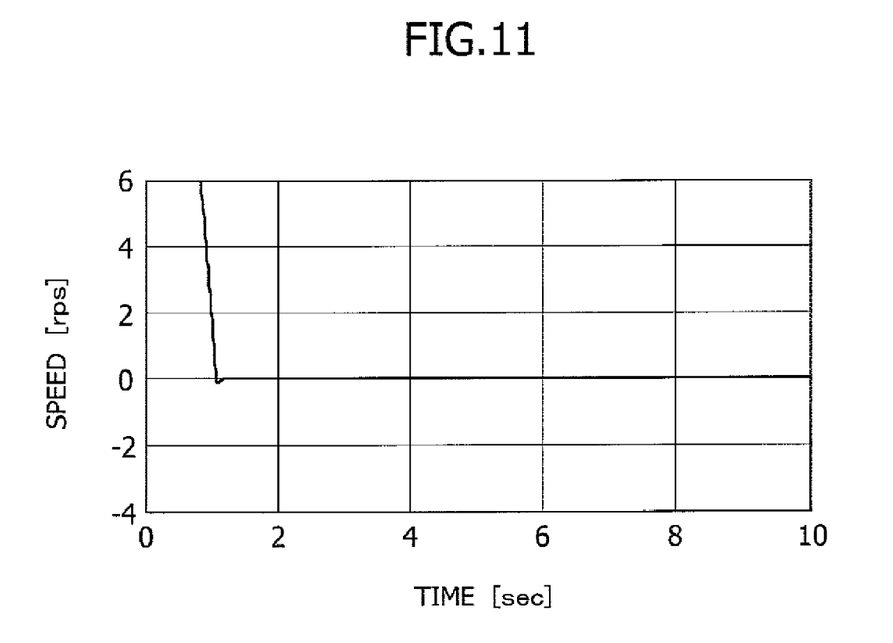
FIG. 11 is a graph showing behavior of the speed of the load machine after operation of the motive power generator is ended in the case in which feed-forward control using the vibration suppression control variable is performed.

However, if the vibration suppression control described above is performed, as shown in FIG. 11, the load machine 38 quickly stops without substantial vibration after the operation of the motive power generator 37 is terminated.

Figure 15:
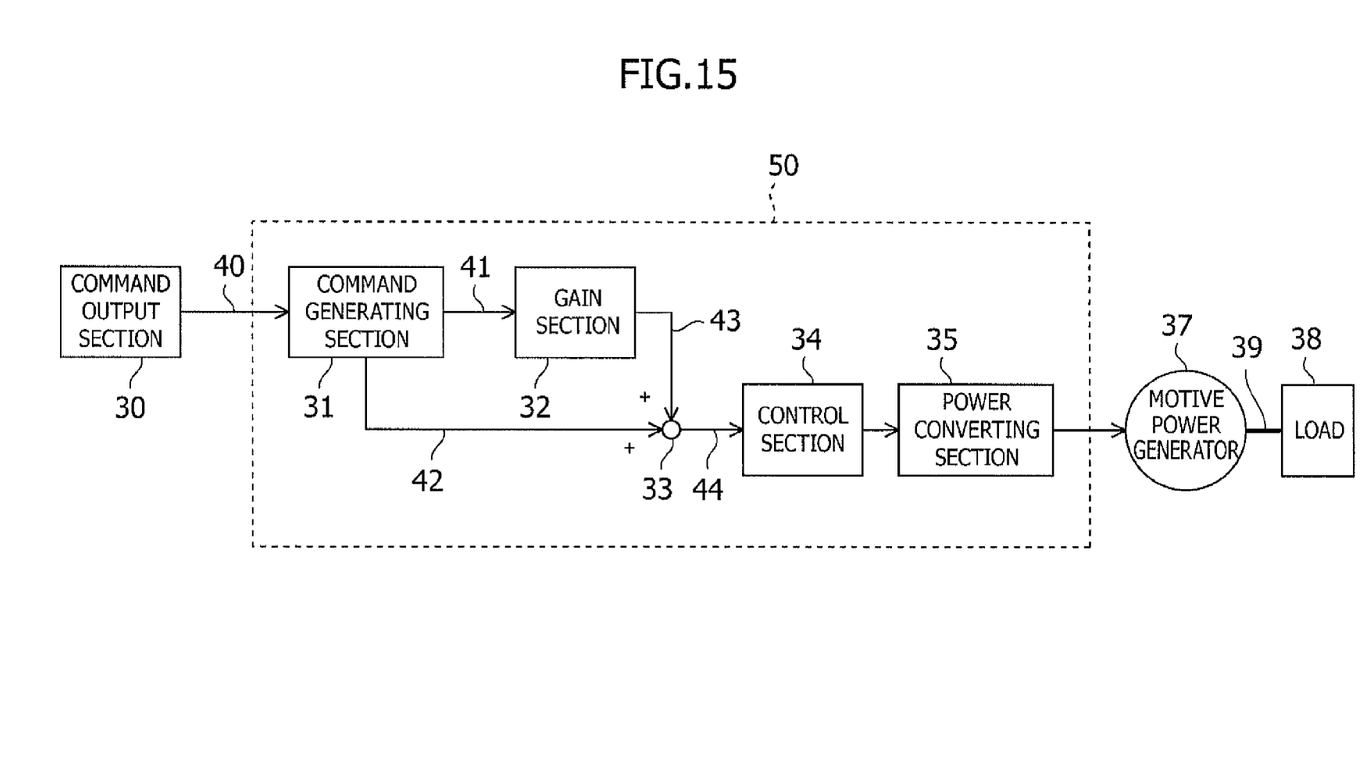
FIG. 15 is a block diagram showing a control apparatus according to the present invention that has an open loop configuration.

In the first embodiment described above and embodiments shown in FIGS. 13 and 15 described later, the position command 40 output from the command output section 30 is composed of a pulse sequence. However, the position command 40 output from the command output section 30 can be composed of analog signals. In this case, the command generating section 31 performs a calculation for estimating the acceleration command 41 and the position command 42 in phase with each other from the analog position command 40.

Figure 12:
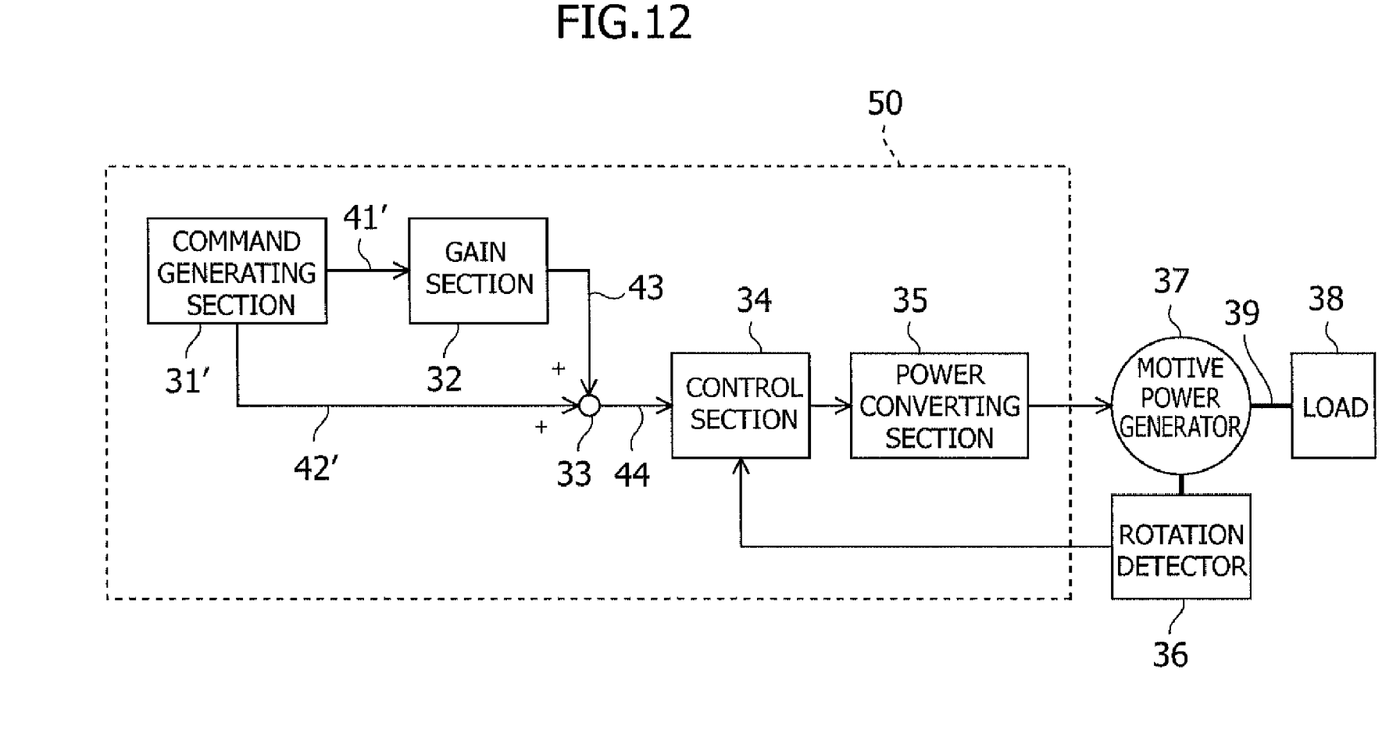
FIG. 12 is a block diagram showing a control apparatus according to a second embodiment of the present invention.

FIG. 12 shows a control apparatus according to a second embodiment of the present invention. The control apparatus according to the second embodiment has a command generating section 31' that directly generates an acceleration command 41' and a position command 42' in phase with each other. The command generating section 31' stores the acceleration command 41' and the position command 42' in phase with each other in a built-in storage device, for example, and reads out and outputs the acceleration command 41' and the position command 42' as required.

The control apparatus according to this embodiment does not require the command output section 30 show in FIG. 7 because the command generating section 31' in the control unit 50 has the function described above. Therefore, the configuration is simplified, and wiring between the command output section 30 and the control unit 50, which is necessary in the first embodiment, is omitted.

To effectively suppress the vibration of the load machine 38, it is desirable to set the vibration suppression control gain defined based on the relationships expressed by Formulas (8) and (9) as accurately as possible.

This is because the motion of the inertial system abruptly changes when the acceleration changes, and therefore, if the vibration suppression control gain is set with low accuracy, there is a possibility that the excitation force increases and enhances the vibration of the load machine 38, which is undesirable. If the vibration is increased in this way, noise is generated, and the load on the load machine 38 increases.

Figure 13:
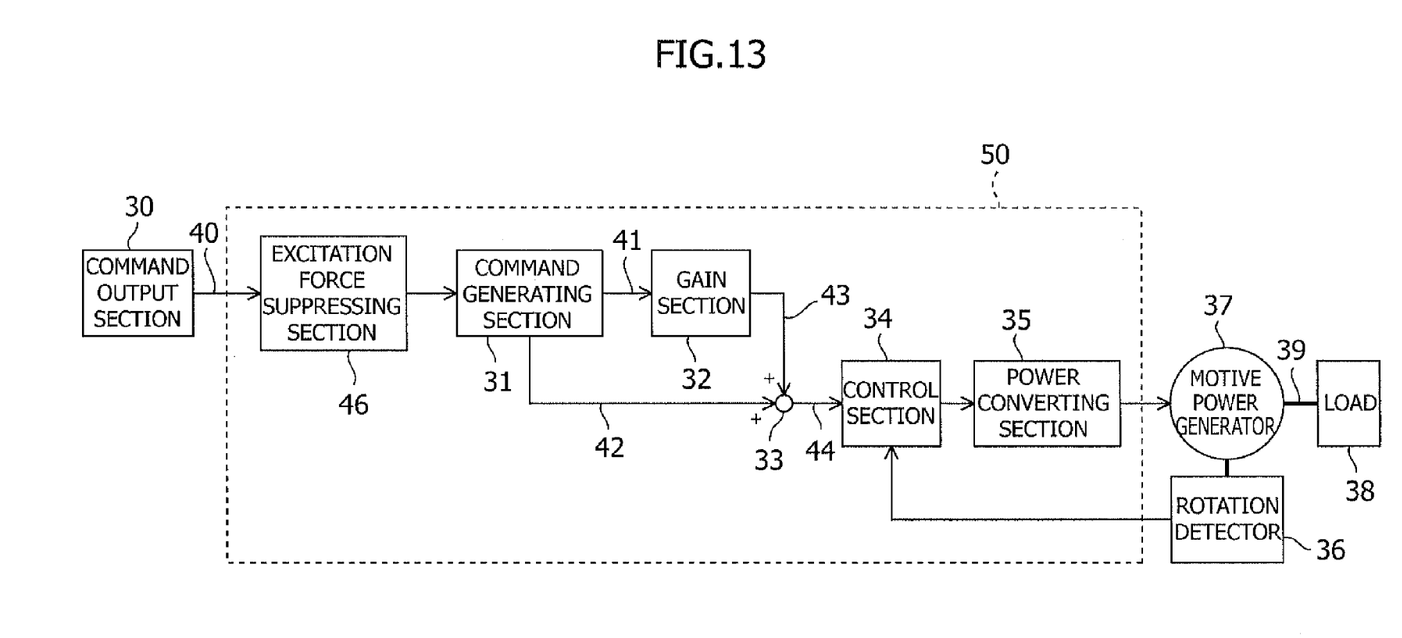
FIG. 13 is a block diagram showing a control apparatus according to a third embodiment of the present invention, which is the control apparatus shown in FIG. 7 additionally provided with an excitation force suppressing section.

FIG. 13 shows a control apparatus according to a third embodiment of the present invention, which is configured taking the possibility described above into consideration. The control apparatus according to this embodiment has the configuration of the control apparatus shown in FIG. 7 additionally provided with an excitation force suppressing section 46 between the command output section 30 and the command generating section 31.

The excitation force suppressing section 46 is composed of a filter element, such as a low pass filter and a notch filter. Therefore, the excitation force suppressing section 46 functions to suppress an abrupt change component (a jerk component) of the position command 40 which is composed of a pulse sequence output from the command output section 30.

As described above, if the accuracy of the vibration suppression control gain used in the gain section 32 is low, there is a possibility that the excitation force will increase and increase the vibration of the load machine 38 when the acceleration changes. However, the excitation force suppressing section 46 functions to suppress an abrupt acceleration change as described above and therefore prevents the excitation force from increasing even if the accuracy of the vibration suppression control gain is low.

However, when only the effect of the excitation force suppressing section 46 is used for vibration suppression control, the motion of the inertial system to be controlled is slowed, and therefore, positioning of the inertial system takes longer.

Thus, the control apparatus according to this embodiment, which performs both vibration suppression control based on the vibration suppression control operation quantity variable 43 and vibration suppression control using the excitation force suppressing section 46, achieves a higher vibration suppression effect because defects of the vibration suppression controls are counterbalance for each other. Even when the motive power generator 37 cannot follow a command because of the operational conditions, the vibration of the inertial system can be suppressed to reduce noise and the load on the load machine 38.

The excitation force suppressing section 46 used in this embodiment performs filtering of the position command 40 output from the command output section 30. However, the excitation force suppressing section 46 can be replaced with a first excitation force suppressing section that performs filtering of the acceleration command 41 and a second excitation force suppressing section that performs filtering of the position command 42. In this case, the first and second excitation force suppressing sections have the same frequency characteristics.

Figure 14:
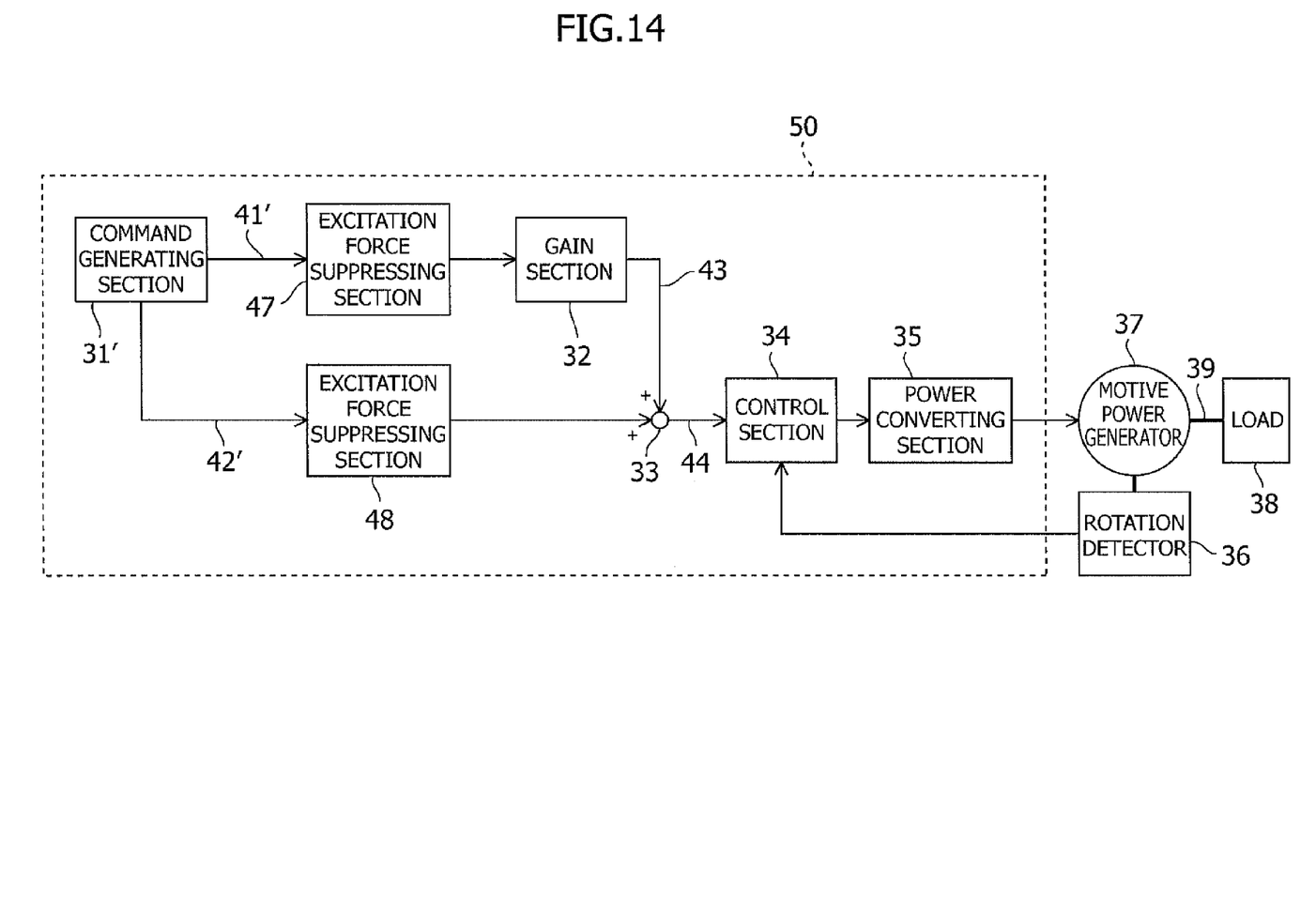
FIG. 14 is a block diagram showing a control apparatus according to a fourth embodiment of the present invention, which is the control apparatus shown in FIG. 12 additionally provided with excitation force suppressing sections.

FIG. 14 shows a control apparatus according to a fourth embodiment of the present invention, which is the control apparatus shown in FIG. 12 additionally provided with excitation force suppressing sections 47 and 48. The excitation force suppressing section 47 is provided between an acceleration command output terminal of the command generating section 31' and the gain section 32, and the excitation force suppressing section 48 is provided between a position command output terminal of the command generating section 31' and the adder 33.

As with the excitation force suppressing section 46 shown in FIG. 13, the excitation force suppressing sections 47 and 48 are composed of a filter element, such as a low pass filter and a notch filter. Therefore, the excitation force suppressing sections 47 and 48 function to suppress an abrupt change component (a jerk component) of the acceleration command 41' and the position command 42' output from the command generating section 31', respectively.

The control apparatus according to this embodiment has both the advantage of quick positioning of the inertial system, which is provided by the vibration suppression control variable, and the advantage of suppressing of abrupt motion of the inertial system at the time of acceleration change, which is provided by the excitation force suppressing sections 47 and 48. Therefore, as with the control apparatus according to the third embodiment, the control apparatus according to this embodiment is highly effective in suppressing the vibration of the load machine 38.

In the embodiments shown in FIGS. 7, 12, 13 and 14, the output of the rotation detector 36 is supplied to the control section 34 as feedback information. However, the feedback information is not essential for implementing the present invention. For example, a control apparatus having an open loop configuration shown in FIG. 15, which is formed by removing the rotation detector 36 from the control apparatus having the closed configuration shown in FIG. 7, has the vibration suppression effect equivalent to the control apparatus having the closed configuration.

The control apparatus according to the present invention can be effectively applied to control of an inertial system including a motive power generator and a driven mechanical element firmly connected to the motive power generator, such as a slider, a cylinder, and a rotary table. That is, the control apparatus according to the present invention can be applied to various mechanical apparatus (such as robots, machine tools, conveying machines, and semiconductor manufacturing apparatuses) having an inertial system including a motive power generator, a power transmission element, and a load machine.

The motive power generator included in the inertial system is not limited to an electric rotary machine or an electric translation machine. The present invention can be applied to cases in which the motive power generator is a non-electric motive power generator, such as a hydraulic pump and an internal combustion engine, without any problem.

In the control apparatus shown in FIG. 7, the command generating section 31, the gain section 32, the adder 33, the control section 34, and the power converting section 35 are integrated as the control unit 50. However, the command generating section 31, the gain section 32, and the adder 33 can be integrated as a command generator unit, and the control section 34 and the power converting section 35 can be integrated as a control/drive unit.

Similarly, in the control apparatus shown in FIG. 12, the command generating section 31', the gain section 32 and the adder 33 can be integrated as a command generator unit, and the control section 34 and the power converting section 35 can be integrated as a control/drive unit. For the control apparatus shown in FIGS. 13 to 15, the components can be unitized in the same manner.

(Reference Numerals)

| | |
|---|---|
| 1, 11, 111 | torque transmission element |
| 2 | load |
| 12, 112 | load machine |
| 13, 113 | double integrator |
| 14 | vibration suppression control gain |
| 15 | vibration suppression control variable |
| 30 | command output section |
| 31, 31' | command generating section |
| 32 | gain section |

(Reference Numerals)

| | |
|---|---|
| 33 | adder |
| 34 | control section |
| 35 | power converting section |
| 36 | rotation detector |
| 37 | motive power generator |
| 38 | load machine |
| 39 | torque transmission element |
| 40 | input pulse sequence |
| 41, 41' | acceleration command |
| 42, 42' | position command |
| 43 | vibration suppression control variable |
| 44 | control command |
| 45 | velocity command |
| 46, 47, 48 | excitation force suppressing section |
| 50 | control unit |

What is claimed is:

1. A method for controlling an inertial system that has a motive power generator, a load machine, and a torque transmission element that couples the motive power generator and the load machine to each other, the method comprising:
a step of generating a position command and an acceleration command that are in phase with each other;
a step of setting a vibration suppression control variable by multiplying said acceleration command by a predetermined gain; and
a step of forming a control command by adding said vibration suppression control variable to said position command.

2. The method for controlling an inertial system according to claim 1, wherein said step of generating a position command and an acceleration command that are in phase with each other includes a sub-step of estimating said acceleration command based on an input position command and estimating said position command that is in phase with the acceleration command based on the estimated acceleration command.

3. The method for controlling an inertial system according to claim 2, wherein said input position command is composed of a pulse sequence.

4. The method for controlling an inertial system according to any of claims 1 to 3, further comprising:
a step of suppressing jerk components of the position command and the acceleration command that are in phase with each other using first and second filter elements having the same frequency characteristics, respectively.

5. The method for controlling an inertial system according to any of claims 2 to 3, further comprising:
a step of suppressing a jerk component of said input position command using a filter element.

6. The method for controlling an inertial system according to claim 1, wherein said gain is set based on an anti-resonance frequency of said inertial system.

7. The method for controlling an inertial system according to claim 1, wherein said gain is set based on a stiffness coefficient of said torque transmission element and an inertia value of said load machine.

8. An apparatus for controlling an inertial system that has a motive power generator, a load machine and a torque transmission element that couples the motive power generator and the load machine to each other, the apparatus comprising:
a command generating device for generating a position command and an acceleration command that are in phase with each other;
an variable setting device for setting a vibration suppression control variable by multiplying said acceleration command by a predetermined gain;

a control command forming device for forming a control command by adding said vibration suppression control variable to said position command; and a driving device for driving said motive power generator based on said control command.

9. The apparatus for controlling an inertial system according to claim 8, wherein said command generating device is configured to estimate said acceleration command based on an input position command and estimate said position command that is in phase with the acceleration command based on the estimated acceleration command.

10. The apparatus for controlling an inertial system according to claim 9, wherein said input position command is composed of a pulse sequence.

11. The apparatus for controlling an inertial system according to claim 8, wherein said command generating device is configured to internally, directly generate the position command and the acceleration command that are in phase with each other.

12. The apparatus for controlling an inertial system according to any of claims 8 to 11, further comprising:

first and second filter elements that suppress jerk components of the position command and the acceleration command that are in phase with each other, respectively, wherein the first and second filter elements have the same frequency characteristics.

13. The apparatus for controlling an inertial system according to any of claims 9 to 10, further comprising:

a filter element that suppresses a jerk component of said input position command.

14. The apparatus for controlling an inertial system according to claim 8, wherein said gain is set based on an anti-resonance frequency of said inertial system.

15. The apparatus for controlling an inertial system according to claim 8, wherein said gain is set based on a stiffness coefficient of said torque transmission element and an inertia value of said load machine.

16. The apparatus for controlling an inertial system according to claim 8, wherein said variable setting device has a way to manually adjust said gain.

17. An industrial machine that uses a control apparatus according to claim 8.

* * * * *